United States Patent Office 3,720,530
Patented Mar. 13, 1973

3,720,530
COMPOSITION FOR PREVENTING RUSSET ON POME FRUIT COMPRISING CASEIN AND HYDRATED SILICONE DIOXIDE
Hisajiro Yukinaga, 1-4-2 Kusatsu, Kusatsu-shi, Japan; Yoshimasa Nan'jo, 3-6 Asahigaoka-cho, Tondabaya-shi, Japan; and Takashi Wada, 2455 Kariya, Ako, Japan
No Drawing. Filed July 30, 1971, Ser. No. 167,816
Claims priority, application Japan, Sept. 7, 1970, 45/78,270
Int. Cl. C08h *17/02*
U.S. Cl. 106—146         6 Claims

ABSTRACT OF THE DISCLOSURE

An agricultural composition for preventing a russet formation on pome fruit comprising not less than 50% by weight of finely divided, amorphous and hydrated silicon dioxide being substantially $SiO_2 \cdot nH_2O$, not more than 10% by weight of casein, and an agriculturally acceptable carrier.

---

This invention relates to a method and a composition for preventing a russet formation on pome fruits such as apples and pears which comprises treating the fruits with an agricultural composition containing finely divided, amorphous and hydrated silicon dioxide, which will be hereinafter referred to by its popular name as white carbon, jointly with casein as an active ingredient.

A russet is a sort of physiological disorder appearing on a surface of fruits such as apples and pears and sometimes as grapes, peaches and citrus, and it is observed to be composed of cork cells or corky substances and it has an appearance like a rust of metals. As generation of a russet lowers a commercial value of fruits, it has been a desideratum for orchardists to be provided an economical and labour-saving measure having a certain effect for preventing a russet.

For these measures, a classically known bag-covering method for wrapping each young fruit with paper like a used newspaper or with a synthetic film, which has a certain effect but requires much labour, a method for treating fruits with calcium compounds such as calcium carbonate and calcium oxide, a method for coating a fruits surface with a waxy substance such that emulsified paraffine wax and a method for coating or spraying over a fruit surface with emulsified synthetic polymer such as polyvinylacetate, polyvinylacrylacetate resins, polyvinylalcohol, carboxymethylcellulose, etc. have been employed.

However, they are not sufficient in regards to their preventing effect and/or economical and/or labour-saving viewpoints.

It is observed by the inventors that humidity has a very close connection with formation of a russet and when water stays on a fruit surace for some time, it causes epidermal cells to death, then, corky cells are promoted to produce, and the more sudden a change of humidity on a fruit surface is, the more a russet formation is found.

White carbon, one of the active ingredients of this invention, is cohesions of a particle having a very small diameter size and has a very great specific surface area in comparison with its volume and its surface structure is presumed under an electron microscope to be porous. White carbon has an intensive hydration and absorption ability and every particle forms secondary and tertiary molecular cohesion, thus, it has characteristic of absorbing and discharging water from its cavities or openings as changing of environmental humidity. Another characteristic is an ability for absorbing ultraviolet ray. Therefore, white carbon is expected for the first time by the inventors to be able to avail as a sort of buffer agents for controlling humidity and light on a fruit surface.

White carbon is conformed to a chemical formula for $SiO_2 \cdot nH_2O$ and it is industrially standardized by:

Appearance: white and finely divided powders
Weight reduction by drying: less than 10%
Weight reduction by severe heating: less than 6%
pH: 10.9 to 2.5
Apparent specific gravity: 0.1 to 0.2
Content of silicon dioxide: about 85%
Content of ferric oxide and alminium oxide: less than 4%.

however, white carbon having less quality that the preceding standards is also available for the purpose of this invention if it will submit to suffer less results.

Casein, another active ingredient, is enough to be available for the purpose of this invention with one which being obtainable in a common market. As casein is soluble in alkali but sprangly soluble in water, addition of some alkaline substance like calcium oxide is needed when it is used in combination with acidic white carbon.

According to the invention, preliminarily an aqueous emulsion containing the active ingredient composed of not less than 50 parts by weight of white carbon and more than 10 parts by weight of casein is prepared for the purpose of convenient transportations and sales, then at an occasion for use, the emulsion is diluted with water to the concentration of 2 to 3% w./v. On one day during 1st to 7th days after anthesis, subject trees are sprayed over by the diluted emulsion directing towards fruits, and following sprays are carried out in the same manner as the first spray one or two times at the interval of 7 to 10 days from the first, thus, the object of the invention is practically attainable. A single dose of the diluted emulsion per tree is sufficient to be 5 to 50 litres. An agricultural composition of this invention may be added by suitable adjuvants such as a wetting agent and a spreading agent and other surface active agents and, moreover, other agricultural polymer emulsions, insecticides and fungicides and so on may be added unless otherwise no injurious effects shall be found on the russet preventing effect of the present invention.

Some embodiment carried out according to the precedingly stated method is shown below for illustrative purposes:

Example I (hereinafter be denoted as Preparation I)

|  | Percent by weight |
|---|---|
| White carbon (pH 5.3–5.6) | 90 |
| Casein | 1.5 |
| Calcium oxide | 8.5 | were emulsified with water to prepare an emulsion being the concentration of 3% w./v.

Example II (hereinafter be denoted as Preparation II)

|  | Percent by weight |
|---|---|
| White carbon (pH 10.4–10.9) | 98.25 |
| Casein | 0.75 |
| Lignin | 1.0 | were emulsified with water to prepare an emulsion being the concentration of 2% w./v.

Results obtained are shown in the following tables:

TABLE I.—APPLE: VAR. GOLDEN DELICIOUS

[A degree of russet formation was categorized as "No," "Slight," "Little," "Medium" and "Much" wherein apples being "No" plus "Slight" were designated as "Marketable fruits."]

|  | Percent | | | | | Marketable rate of apples | Russet formation rate of apples |
|---|---|---|---|---|---|---|---|
|  | Degree of russet formation | | | | | | |
|  | No | Slight | Little | Medium | Much | | |
| Preparation: | | | | | | | |
| I | 55.0 | 40.0 | 5.0 | 0 | 0 | 95.0 | 0.50 |
| II | 20.0 | 75.0 | 5.0 | 0 | 0 | 95.0 | 0.85 |
| III | 40.0 | 50.0 | 10.0 | 0 | 0 | 90.0 | 0.70 |
| IV | 10.0 | 50.0 | 40.0 | 0 | 0 | 60.0 | 1.30 |
| V | 5.0 | 30.0 | 60.0 | 5.0 | 0 | 35.0 | 1.65 |
| White carbon (pH 5.3–6.3) | 10.0 | 50.0 | 35.0 | 5.0 | 0 | 60.0 | 1.35 |
| Non-treated | 0 | 15.0 | 60.0 | 25.0 | 0 | 15.0 | 2.10 | wherein Preparation III signified a preparation composed of 99.85% by weight of white carbon and 0.15% by weight of polyethylene nonylphenolether, Preparation IV signified one composed of 99.85% by weight of white carbon and 0.15% by weight of the mixture of polyoxyethylenealkylarylether and alkylarylsulfonate, and Preparation V signified one composed of 0.37% by weight of vinylchloride emulsion being added to Preparation I. Each of the Preparations was diluted in the same manner as were Preparations I and II, and was used for the above stated experiment.

TABLE II.—APPLE: VAR. GOLDEN DELICIOUS

[A degree of russet formation was categorized as "No," "Little," "Medium" and "Much" wherein apples being "No" plus "Little" were designated as "Marketable fruits."]

|  | Concentration, percent | | Times of spraying | Number of fruits inspected | Percent | | | | Marketable rate of fruits inspected |
|---|---|---|---|---|---|---|---|---|---|
|  | Active ingredient | Adjuvant | | | Degree of russet formation | | | | |
|  | | | | | No | Little | Medium | Much | |
| Preparation: | | | | | | | | | |
| I | 3 |  | 3 | 100 | 64.8 | 29.3 | 5.8 | 0 | 94.2 |
| II | 2 |  | 2 | 100 | 77.3 | 16.0 | 2.7 | 4.0 | 93.3 |
| V | 3 | 1 | 2 | 100 | 62.0 | 17.3 | 16.0 | 4.9 | 79.5 |
| Vinylchloride emulsion plus calcium oxide | 5 | 2 | 2 | 100 | 72.3 | 11.9 | 10.0 | 5.8 | 84.2 |
| α-Olefin resin plus calcium oxide | 1.7 | 1 | 2 | 100 | 86.2 | 11.7 | 1.2 | 1.0 | 97.9 |
| Non-treated |  |  |  | 100 | 48.4 | 26.4 | 14.7 | 10.5 | 74.8 | wherein Preparation V signified as the same composition as referred in Table I.

TABLE III.—PEAR: VAR. NIJISSEIKI

[Time: At just after harvesting.]

|  | Average weight per fruit (g.) | Degree of dot-russet formation, percent | | | | |
|---|---|---|---|---|---|---|
|  |  | − | ± | + | ++ | +++ |
| Preparation I | 323.5 | 12.7 | 19.5 | 46.7 | 21.3 | 0 |
| α-Olefin resin plus calcium oxide | 309.5 | 9.9 | 29.6 | 39.5 | 19.7 | 1.4 |
| Non-treated | 306.5 | 2.5 | 20.3 | 35.3 | 38.3 | 3.7 |

In the above table, a degree of dot-russet formation on pear fruits was categorized as, −: no
±: almost no
+: a little
++: some
+++: much and the concentration of the preparations herein employed was 3% w./v., that of α-olefin was 1% w./v. and that of calcium oxide was 2% w./v. The sprays were carried out on 7th and 14th days after anthesis.

TABLE IV.—PEAR: VAR. NIJISSEIKI

|  | Waxy substance formed on surface of pear fruits, percent | | | | |
|---|---|---|---|---|---|
|  | − | ± | + | ++ | +++ |
| Preparation I | 0 | 19.4 | 57.4 | 23.2 | 0 |
| α-Olefin resin plus calcium oxide | 0 | 14.2 | 65.2 | 20.4 | 0.3 |
| Non-treated | 4.3 | 33.4 | 45.4 | 17.0 | 0 |

In the above Table IV, quantities of a waxy subtance formed on the surface of pear fruits were categorized as, −: no
±: almost no
+: a little
++: some
+++: much and the concentration of the preparations herein employed was as same as that in Table III.

TABLE V.—PEAR: VAR. NIJISSEIKI

|  | Grade of pear fruit for sales, percent | |
|---|---|---|
| Quality | Excellent | Good |
| Preparation I | 32.1 | 67.9 |
| α-Olefin resin plus calcium oxide | 39.5 | 59.2 |
| Non-treated | 22.8 | 73.6 |

From the results found in the Tables I to V, a composition of this invention is identified to exhibit a superior effect for preventing russet formation on apple and pear fruits to those of white carbon by itself, other preparations which contain spreading agents jointly with white carbon and other known preparations, and almost as the same effect as that of a classical bag-covering method. Thus, it may certainly prevent a russet formation on pome fruits economically and may well serve for labour saving.

What is claimed is:

1. An agricultural composition for preventing a russet formation on pome fruit comprising:
   (a) not less than 50% by weight of finely divided, amorphous and hydrated silicon doxide being substantially $SiO_2 \cdot nH_2O$;
   (b) not more than 10% by weight of casein; and,
   (c) an agriculturally acceptable carrier.

2. The composition according to claim 1, wherein the finely divided, amorphous and hydrated silicon dioxide has the following industrial standard:
   Appearance: white and finely divided powders
   Weight reduction by drying: less than 10%
   Weight reduction by severe heating: less than 6%
   pH: from 10.9 to 2.5
   Apparent specific gravity: about 85%
   Content of ferric oxide and alminium oxide: less than 4%

3. The composition according to claim 1, wherein said composition is an aqueous emulsion containing 2% to 3% w./v. of an ingredient having the proportion of about 90 parts by weight of the acidic finely divided, amorphous and hydrated silicon dioxide, about 1.5 parts by weight of casein and about 8.5 parts by weight of calcium oxide.

4. The composition according to claim 2, wherein said composition is an aqueous emulsion containing 2% to 3% w./v. of an ingredient having the proportion of about 90 parts by weight of the acidic finely divided, amorphous and hydrated silicon dioxide, about 1.5 parts by weight of casein and about 8.5 parts by weight of calcium oxide.

5. The composition according to claim 1, wherein said composition is an aqueous emulsion containing 2% to 3% w./v. of an ingredient having the proportion of about 98.5 parts by weight of the alkaline finely divided, amorphous and hydrated silicon dioxide, about 0.25 part by weight of casein and about 1 part by weight of lignin.

6. The composition according to claim 2, wherein said composition is an aqueous emulsion containing 2% to 3% w./v. of an ingredient having the proportion of about 98.5 parts by weight of the alkaline finely divided, amorphous and hydrated silicon dioxide, about 0.25 part by weight of casein and about 1 part by weight of lignin.

References Cited

FOREIGN PATENTS 1,141,232   6/1963   Germany.

OTHER REFERENCES

Chem. Abst. 23, 1217, 1929.

THEODORE MORRIS, Primary Examiner

U.S. Cl. X.R.

117—3